United States Patent [19]
Heasley

[11] Patent Number: 5,363,732
[45] Date of Patent: Nov. 15, 1994

[54] COPING APPARATUS

[76] Inventor: Raymond E. Heasley, 38 Silver La., McKees Rocks, Pa. 15136

[21] Appl. No.: 34,489

[22] Filed: Mar. 19, 1993

[51] Int. Cl.$^5$ ............................ B27B 5/02; B27B 5/18
[52] U.S. Cl. .................................... 83/471.2; 83/414; 83/477.1; 83/486; 83/565
[58] Field of Search ............... 83/414, 565, 471.2, 83/471.3, 483, 485, 486

[56]  References Cited
U.S. PATENT DOCUMENTS

| | | |
|---|---|---|
| 429,213 | 3/1890 | Jacobson . |
| 860,486 | 7/1907 | King ..................................... 83/565 |
| 3,254,684 | 6/1966 | Hawkins . |
| 3,473,580 | 10/1969 | Dunn et al. . |
| 3,942,566 | 3/1976 | Schmidt ........................ 144/144 R |
| 3,979,988 | 9/1976 | Best ..................................... 83/820 |
| 4,249,446 | 2/1981 | Tallerico ............................ 83/789 |

Primary Examiner—Hien H. Phan
Attorney, Agent, or Firm—Clifford A. Poff

[57]  ABSTRACT

A coping apparatus is provided to impart to the end portion of a molding. A contoured surface corresponding to the profile of the face surface of the molding. The coping apparatus includes a circular saw that is mounted on two sliding bases for freedom of movement in "X" "Y" directions. Beside the circular saw there is a support for a stylus used to control the positioning of the saw blade by traversing movement along the profile of a template. The template is supported on a stationary base underlying a table of which the end portion of the molding to be coped is supported.

10 Claims, 4 Drawing Sheets

5,363,732

COPING APPARATUS

BACKGROUND OF THE INVENTION

1. Field of the Invention

This invention relates to a coping apparatus utilizing a circular saw blade that is rotated by an arbor coupled to a motor to perform a wood cutting operation while the position of cutting edge of the saw blade is controllably positioned by movement of a stylus along a template in which the cutting operation closely approximately the width of the stylus.

2. Description of the Prior Art

It is known in the art to cope molding by first forming a traced outline as a negative image reproduction of the decorative face profile and then using a coping saw to cut about the end grain of the molding along the traced outline so that the end portion of the molding bears the decorative profile of the molding. The coped end of the molding being so shaped can butt against the face of a separately installed piece of such molding to present an attractive junction, usually at an inside corner. The coping operation however, is laborious and time consuming requiring a degree of extra care for the wood cutting operation. In such a coping operation there is the ever present problem that cut edge is imprecise so that it may not fit snugly against an abutting face of the molding so as to achieve the required appearance. Sometimes, for example, the straight cut formed by the coping saw is angled less than perpendicular to the face whereby the butt face of the coped portion does not seat squarely against the molded face. In other circumstances, even though the coping operation is accurately preformed, the corner of the walls may not be perpendicular whereby a mismatch of the cope end with the holding face occurs.

The present invention departs from the hand cutting method of coping as described above as well as known apparatus is known for coping by forming a coped end on a molding which presents contact edge that can fit snugly against the face of an adjoining edge. The contact edge is formed by an undercut, preferably circular, derived from the use of a circular saw blade.

It is known, for example, from U.S. Pat. No. 4,249,446 to form a coping tracing operation wherein the wood cutting device consists of a round bandsaw blade that is trained about a system of pulleys one of which is driven so that a length of the blade spanning a gap between two pulleys confronts the edge of the molding for the coping operation. The coping apparatus requires that a piece of molding is used as a specimen to define the profile that is to be coped in the end of a second piece of molding. The round bandsaw blade is moved in the direction of its length at a site between the two pieces of molding. The arrangement is such that a specimen and a workpiece are on opposite sides of the blade. The tracing operation causes a movement in a given instance into a valley surface of the specimen brings about a retraction of the round bandsaw blade from the end of the workpiece. As a result, when the probe moves into a void, the blade moves oppositely, namely it retreats from the molding and when the probe detects a protrusion, the blade plunge cuts. The blade is forced to respond to the negative of the profile whereby the faithfulness of reproduction is severely impaired. For example, when the probe retreats because of protrusions on the specimen if the probe separates from the protrusion, an profile destroying plunge cut occurs in the molded workpiece.

SUMMARY OF THE PRESENT INVENTION

According to the present invention there is provided an apparatus to cope molding including the combination of a saw means essentially including a circular saw blade driven about a rotational axis by a motor for defining a predetermined cut width by the saw blade in a molding portion of a length of molding, a template defining a predetermined profile for coping in the molding portion, support means engageable with the length of molding to present the molding portion for coping by the saw means, a stylus having a predetermined width substantially corresponding to the predetermined cut width by the saw blade for traversing the predetermined profile defined by the template, and base means for positioning the saw blade in a confronting relation to cut the molding portion while the stylus operatively confronts the template, the base means further including a moveable base portion relative to a stationary portion for causing relative displacement between the saw blade and the stylus simultaneously with respect to the molding and the template, respectively, to cope the molding portion with the saw blade with the profile of the template as transversed by the stylus.

BRIEF DESCRIPTION OF THE DRAWINGS

The present invention will be more fully understood when the following description is read in light of the accompanying drawings in which.

DETAILED DESCRIPTION OF THE PREFERRED EMBODIMENTS

Figure 1:
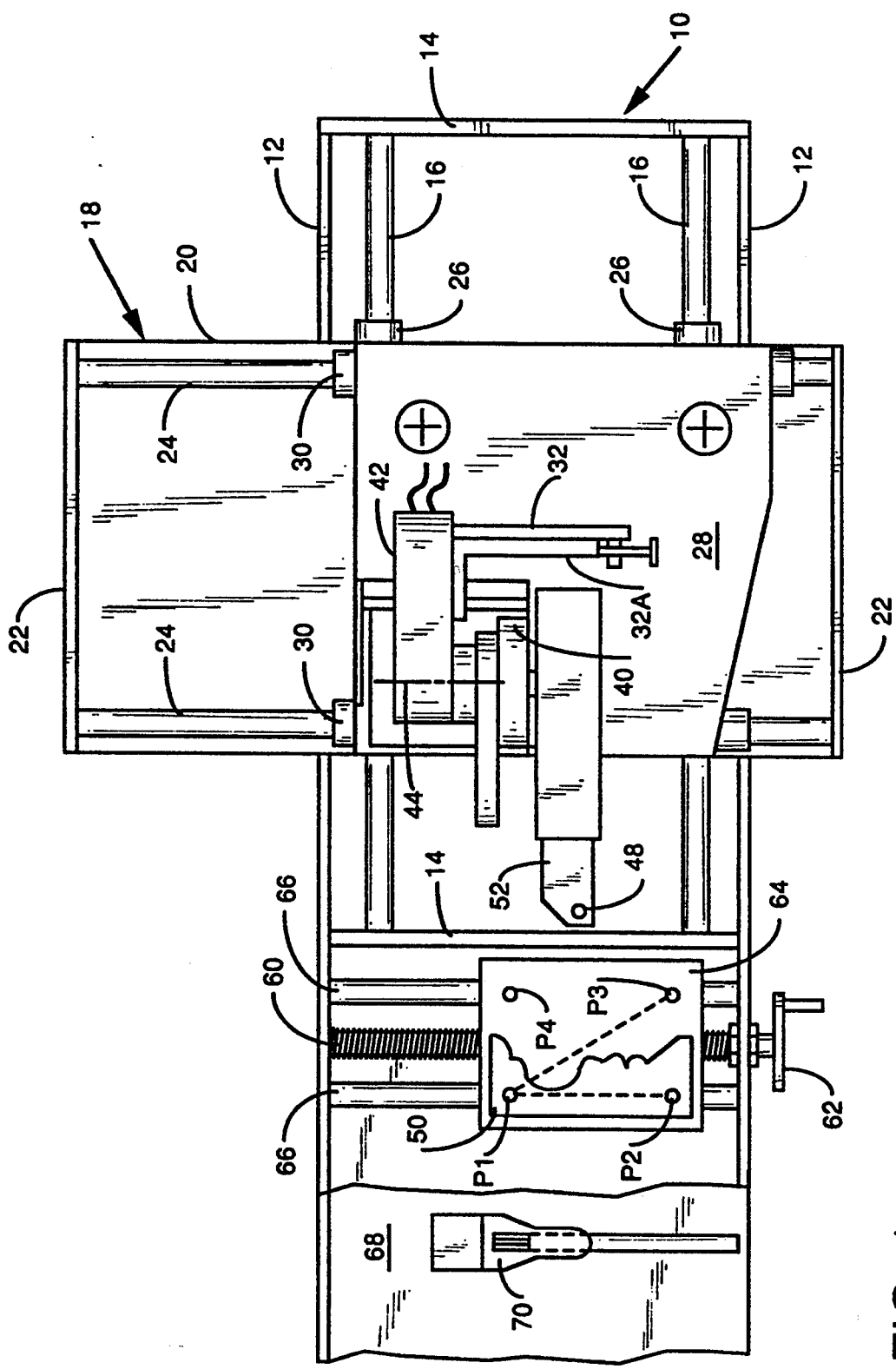
FIG. 1 is a plan view with a broken away portion to expose a template showing the preferred embodiment of coping apparatus according to the present invention.
Figure 2:
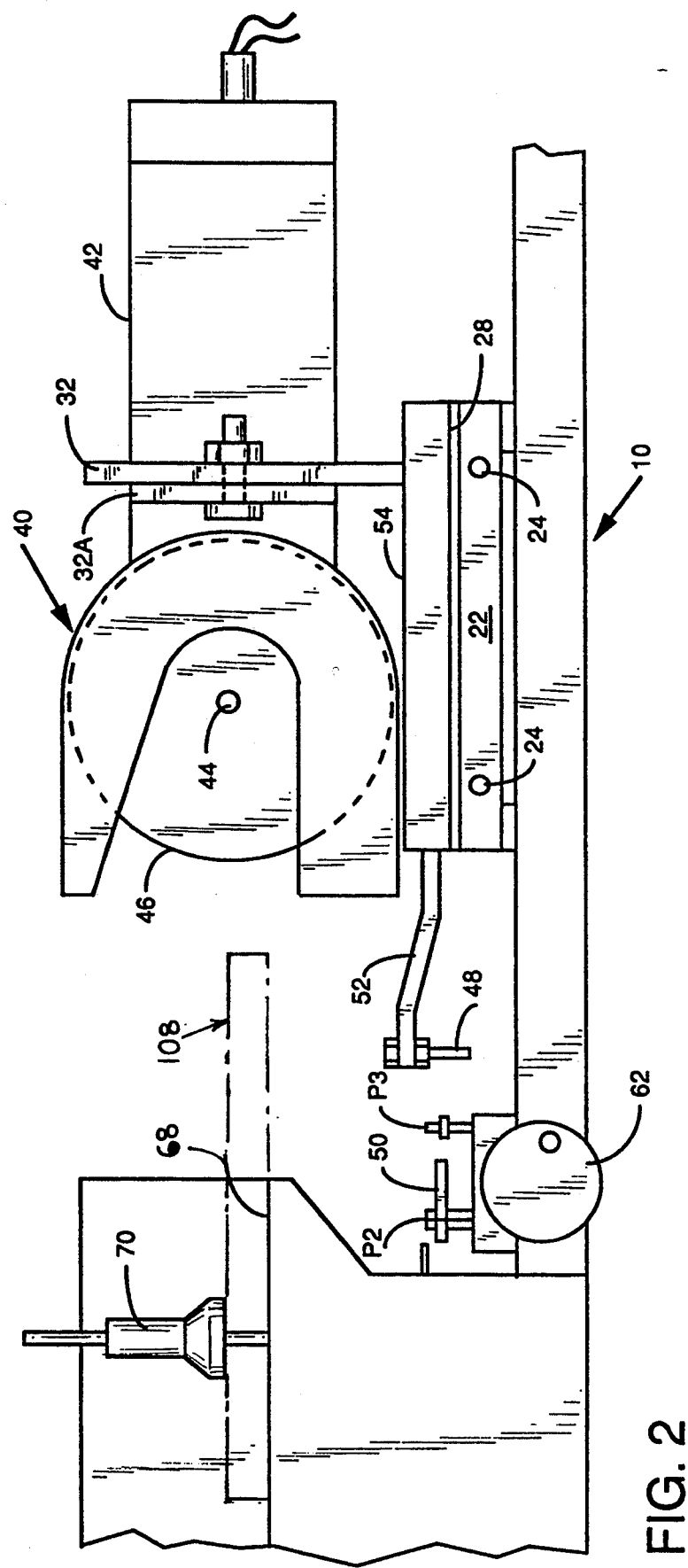
FIG. 2 is a side elevational view of the coping apparatus shown in FIG. 1.
Figure 3:
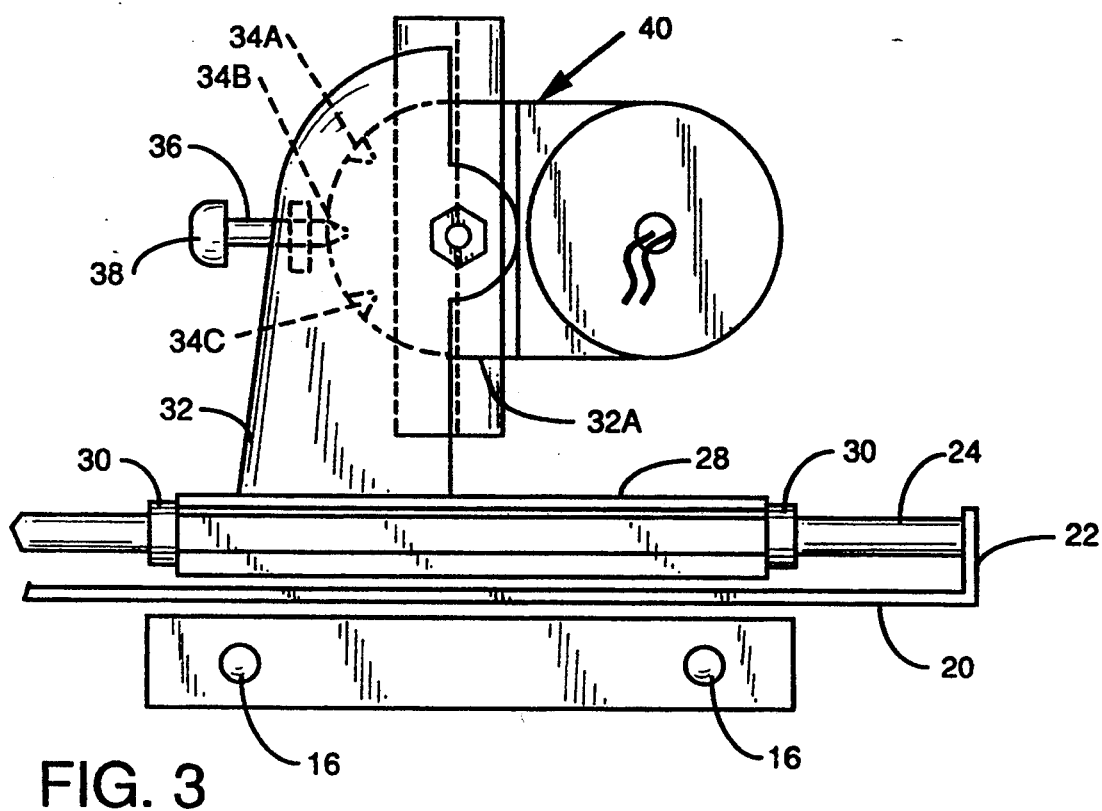
FIG. 3 is an end elevational view taken along lines III—III of FIG. 2.

As shown in FIGS. 1–3 of the drawings, the coping apparatus of the present invention includes a base 10 which takes the form of a rectangularly shaped structure that can derive its support from a table top or the like. Upstanding sides 12 are held in a spaced apart relation by end plates 14. Between the sides 12 and supported by the end plates 14 there extends spaced apart parallel rods 16. A moveable base 18 includes a floor wall 20 supporting in a spaced apart relation end plates 22. A pair of spaced apart parallel rods 24 are supported by and extend between the end plates 22. Protruding downwardly from the floor wall 20 brackets 26 which support linear bearings (not shown) whereby the moveable base 18 can slide to and fro in the direction of the length of rods 16 and therealong. Similarly, there extends downwardly from a base plate 28, brackets 30 that in turn support linear bearings to allow to and fro movement from the base plate 28 along rods 24. As a matter of convention, the moveable base 18 slides in the "X" direction along rods 16 and the base plate 28 slides linearly in the "Y" direction along rods 24.

Figure 6:
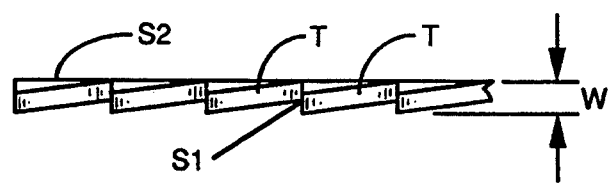
FIG. 6 is a partial view of the peripheral of the saw blade shown in FIG. 5.
Figure 5:
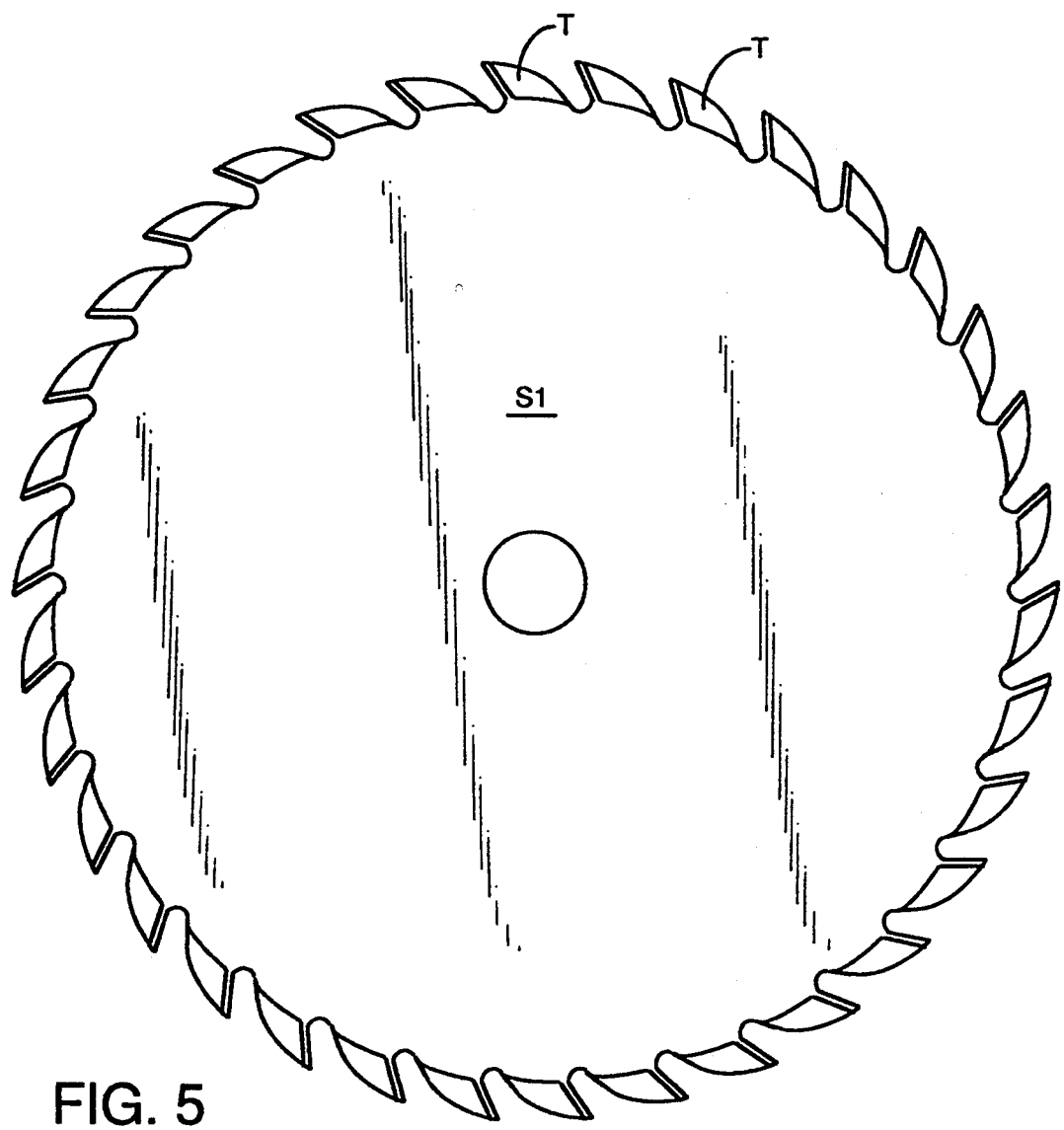
FIG. 5 is a side view showing one face of a saw blade having teeth set to one side.

The base plate 28 supports an upstanding bracket 32 and forms a support trunion for an indexing plate 32A. The trunion is formed with indexing notches 34A, 34B and 34C in the peripheral edge of the indexing plate which cooperatively interlock with an indexing pin 36 that is spring loaded and controlled by a handle 38. The indexing trunion pivotally supports a housing of a motor driven circular saw assembly 40. The saw assembly 40 includes an electric motor 42 having a drive output shaft connected through a right angle beveled gear drive to an arbor which is rotated by the motor about an axis 44 and onto which there is mounted a circular saw blade 46. The mounting structure to drivingly interconnect the saw blade with the arbor is per se well known in the art. The saw blade, however, is preferably constructed as shown in FIGS. 5 and 6 with a tooth profile such that a set is imparted to each tooth T in a direction directed toward only one side $S_1$ of the sides $S_1$ and $S_2$ of the saw blade, thus allowing the saw blade to move relative to the workpiece in the direction of the set of the teeth during cutting. Such a tooth set profile is uncommon for circular saw blades. The degree of set imparted to the teeth of the saw blade is further preferably selected so that the width of cut identified by reference numeral W in FIG. 6 by the saw blade substantially corresponds and is preferably equal to the width of a stylus 48 in the scanning direction of the stylus. By this relation, the width of cut by the saw blade is limited to the scanning by the stylus along a template one form of which is shown in FIGS. 1 and 2 and identified by reference numeral 50. It can be seen, however, that the stylus 48 is supported by a carrier bar 52 that is received in a housing 54 that is in turn supported on base plate 28.

The stylus, as shown best in FIG. 2, depends from the carrier bar so that the stylus is fully exposed for contact with the profiled surface 50 of the template. The template is received between pairs of spaced apart mounting pins P1, P2, P3 and P4. When performing a coping operation where the template is used for a substantially right angle corner, pins P1 and P2 are selected for supporting the template. However, when crown molding is to be mounted in a corner, thus requiring a compound angle, pins P1 and P3 are selected for angling the template to form a cut at one end of the crown molding which is performed also only after the saw blade is angled by moving the trunion to engage with index 34C. Similarly, to cut the other end of the crown molding, the pins P2 and P4 are selected to angle the template while at the same time the saw blade is angled by selecting indexing notch 34A. It can be seen that when the template is supported by pins P1 and P3, the template is angled as to its profile with respect to the "X" and "Y" planes of movement by the saw on the base and sub-base. The template can be moved into an aligned desired position with the stylus through operation of an indexing screw 60 that is connected to a hand wheel 62. Depending from a base plate 64 on which pins P1, P2, P3 and P4 are mounted, is a bracket that supports a lead screw nut while threadedly engaged with the lead screw in a manner per se well known in the art. Guide rods 66 engage with linear bearings on the underside of plate 64 constrained the movement of the plate in an "X" direction. Above and overlying somewhat the template, there is a table surface 68 that is horizontal, parallel with "X" and "Y" directions of movement and upon which the molding is supported during a coping operations. To prevent unwanted movement of the molding during these operations, a hold down device 70 is supported by an upstanding side wall to engage a face surface of the molding which is opposite to the surface of the molding engaged with table 68.

Figure 4:
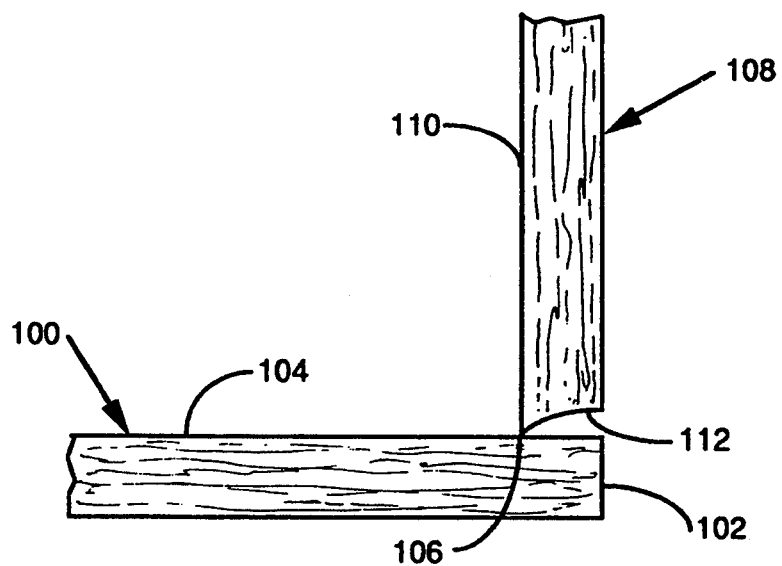
FIG. 4 is an exploded view of a coped edge shown away from face of a molding to illustrate the undercut formed by the apparatus of the present invention.

An important feature of the present invention resides in the use of a circular saw blade to produce a coping cut in the end grain of molding in a manner that produces an undercut which is best shown in FIG. 4. In FIG. 4 there is illustrated a end portion of a base board molding 100 terminating at an end surface 102. The face surface of the base board is identified in FIGS. 2 and 4 by reference numeral 104 and receives in an abutting relation a linear edge 106 formed by the circular undercut terminal edge part of the coped surface on a second base board molding 108. Molding 108 has a decorative face surface 110 which is free of unwanted gaps, voids or misalignment when the two pieces of molding are joined at a corner. The under cut edge is identified by reference numeral 112 and has a radius of curvature corresponding to the radius of a saw blade. Such a radial under cut can not be obtained through the use of a band saw blade. Moreover, the under cut is reliably obtained since the saw blade is stable during the cutting operation and free from vibrations that normally affect a band saw blade.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. Apparatus to cope molding including the combination of:

saw means essentially including a circular saw blade driven about a rotational axis by a motor for defining a predetermined cut width by the saw blade in a molding portion of a length of molding;

a template defining a predetermined profile for coping in said molding portion;

support means engageable with said length of molding to present said molding portion for coping by said saw means;

a stylus having a predetermined width substantially corresponding to said predetermined cut width for traversing the predetermined profile defined by said template; and base means for positioning said saw blade in a confronting relation to cut said molding portion while said stylus operatively confronts said template, said base means further including a moveable base portion relative to a stationary portion for causing relative displacement between the saw blade and the stylus simultaneously with respect to said molding and said template, respectively, to cope said molding portion with the saw blade with the profile of the template as transversed by the stylus.

2. The apparatus according to claim 1 wherein said saw blade includes teeth having a set to one side of a disk shaped blade body.

3. The apparatus according to claim 1 wherein said rotational axis of circular saw blade lies in a plane which is parallel with a plane of said supporting for said length of molding said by said support means.

4. The apparatus according to claim 1 wherein said base means further includes guides arrange for slideably supported said moveable base for displacement within two planes which are mutually perpendicular.

5. The apparatus according to claim 4 wherein said guide means includes pairs of parallel spaced apart guide rods.

6. The apparatus according to claim 1 wherein said moveable base portion includes means for supporting said saw means and said stylus.

7. The apparatus according to claim 1 further including means for adjustably supporting said saw means such that the rotational axis thereof is angularly positionable into a preselected relation to said support means to present the cutting edge of said circular saw blade at a preselected angular relation to said molding portion.

8. The apparatus according to claim 1 wherein said template further includes support means for angularly positioning said template into preselected angular relations with respect to the plane support for said length of molding by said support means.

9. The apparatus according to claim 1 wherein said length of molding is a decorative face surface opposite to a back support surface and wherein the back support surface of the molding engages said support means along a plane coextensive with the rotational axis of said circular saw blade for undercutting the molding portion of the width of molding.

10. The apparatus according to claim 9 wherein said undercutting corresponds to an arc segment of said circular blade.

* * * * *